C. E. TROWBRIDGE.
Machines for Manufacturing Rings for Spinning-Machines.

No. 133,344. Patented Nov. 26, 1872.

Witnesses
C. E. Trowbridge.
by his attorney

UNITED STATES PATENT OFFICE.

CHARLES E. TROWBRIDGE, OF WHITINSVILLE, MASSACHUSETTS.

IMPROVEMENT IN MACHINES FOR MANUFACTURING RINGS FOR SPINNING-MACHINES.

Specification forming part of Letters Patent No. 133,344, dated November 26, 1872.

*To all whom it may concern:*

Be it known that I, CHARLES E. TROWBRIDGE, of Whitinsville, of the county of Worcester and State of Massachusetts, have invented a new and useful Machine for use in Manufacturing the Rings of Spinning - Machines; and I do hereby declare the same to be fully described in the following specification and represented in the accompanying drawing, of which—

Figure 1:
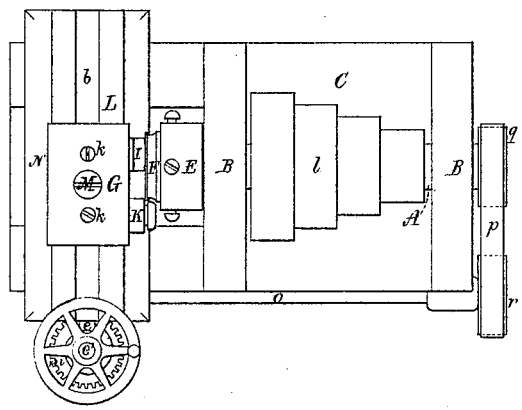
Figure 2:
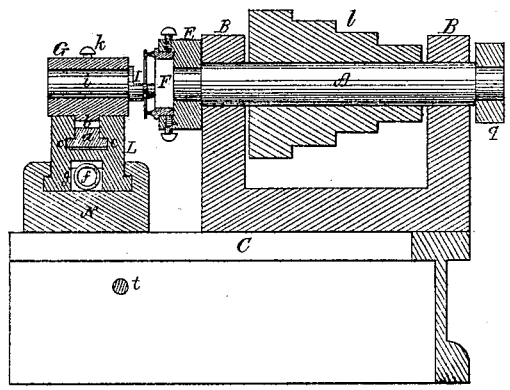
Figure 3:
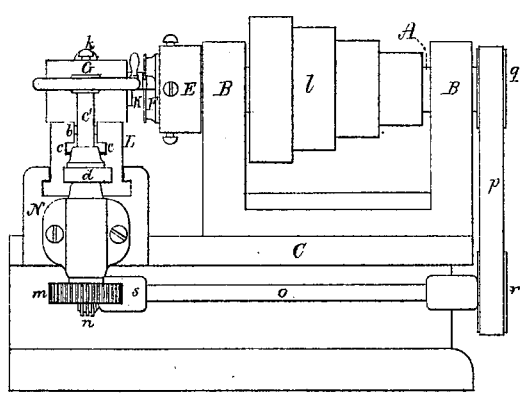

Figure 1 is a top view; Fig. 2, a vertical and longitudinal section; Fig. 3, a side elevation; and Fig. 4, a transverse section through the cutter-carrier.

The machine, while in operation, simultaneously grooves or reduces a ring-blank or short tube on its external and internal curved surfaces or circumferences so as to form it with what is termed a circular race for a "traveler" to run upon.

Heretofore it has been customary to form the ring-grooves at different times and during separate movements of the tools or their cutter-carriers. My machine effects a very great saving in labor and time in making a ring, and, besides, it produces them alike and accurately formed.

In the drawing, A denotes an arbor supported by a lathe-head, B, resting on a bed, C. The arbor, at its inner end, is furnished with a chuck, E, for holding the ring-blank, the drawing representing the ring at F as held by the chuck and finished or grooved. In advance of the chuck is a cutter-carrier, G, from which there projects, in the manner as shown, two grooving-cutters, I K, one being intended to groove the blank in and around its inner curved surface and the other to groove such blank in and around its outer curved surface, such groove being continued entirely around the ring blank or tube. The said cutter-carrier rests upon a slide or carriage, L, to which it is secured by a clamp-screw, M, which goes down through the carrier and is screwed into a nut, $a$, arranged to slide lengthwise in horizontal and vertical grooves $b c c$ formed longitudinally in the carriage L. Such carriage L rests upon and slides lengthwise on another carriage, N, arranged upon the bed C, and applied to it so as to be capable of being moved either toward or away from the arbor-chuck, all being as shown.

Figure 4:
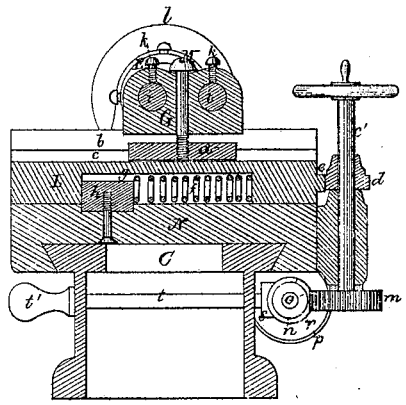
Figure 5:

To one end of the carriage N a vertical hand-wheel shaft, $c'$, is pivoted. A cam, $d$, a horizontal section of which is shown in Fig. 5, is fixed upon the shaft $c'$, and rests on its periphery against a tooth, $e$, projecting from the adjacent end of the carriage L, such carriage being provided with a spring, $f$, for forcing it toward the cam. The spring is arranged in a chamber, $g$, made in the carriage, and rests against one end of such chamber and an abutment, $h$, projecting from the carriage N upward into the chamber, all being as shown in Fig. 4. The shanks $i\ i$ of the two cutters are cylindrical, and supported in corresponding sockets made in the cutter-carrier set-screw $k$ $k$, arranged as shown, serving to fasten the shanks in place.

On revolving the hand-wheel shaft the cam will gradually move the carriage L forward until the most eccentric part of the cam may have passed the tooth $e$. As soon as such may occur the spring will move the carriage back so as to cause the cutters to be retracted in a manner to enable them to be moved away from the ring in the direction of its axis. During the forward movement of the carriage at right angles to the axis of the ring the cutters will be caused to simultaneously groove the ring, both internally and externally.

From the above it will be seen that the grooving-cutters are susceptible of being moved in opposite directions horizontally, either parallel to the axis of the blank or at right angles therewith, as occasion may require, the same being to enable the cutters to be properly applied to the blank in order to groove it while it may be in revolution.

There is fixed upon the arbor a series of driving-pulleys, $s\ l$, to either of which a belt may be applied to revolve the arbor. The hand-wheel shaft is represented as having a worm-gear, $m$, fixed upon it at its lower end to cooperate with an endless screw or worm, $n$, fixed upon a horizontal shaft, $o$, arranged as shown. A driving-belt, $p$, going around a pulley, $q$, of the arbor, and another pulley, $r$, fixed on the shaft $o$, serves, when in action, to impart rotary motion to the latter or the pulley $r$. The shaft $o$, near the worm, is supported in a box, $s$, fixed to a slide-rod, $t$, arranged in the bed in manner as shown in Fig. 4. By taking hold of the handle $t'$ of the slide-rod and properly moving it, the worm may be thrown either into or out of engagement with the worm-gear, whereby the hand-wheel shaft may be operated from the arbor.

In the above-described machine I make no claim to the combination of parts incident to a common lathe, viz., the rotary arbor A, its chuck E, cutter-carrier G, carriages L N, head B, and bed C; but

I claim—

In combination therewith, the two grooving-cutters, I K, wheel-shaft $c'$, gage-cam $d$, tooth $e$, spring $f$, and mechanism for revolving the said shaft $c'$, all arranged and combined substantially as shown and explained, the whole being to enable a ring-blank to be grooved simultaneously in and around its internal and external peripheries, as and for the purpose specified.

CHARLES E. TROWBRIDGE.

Witnesses:
 EDW. WHITIN,
 N. N. STANTON.